United States Patent Office 3,312,591
Patented Apr. 4, 1967

3,312,591
TOPICAL COMPOSITIONS OF 17α,21-ORTHO ESTERS OF BETAMETHASONE HAVING TOPICAL ANTI-INFLAMMATORY ACTIVITY AND THEIR USE
Joseph Elks, London, Peter John May, North Harrow, and Niall Galbraith Weir, Wembley, England, assignors to Glaxo Laboratories Limited, a corporation of Great Britain
No Drawing. Continuation of application Ser. No. 364,804, May 4, 1964. This application July 19, 1966, Ser. No. 567,309
Claims priority, application Great Britain, May 10, 1963, 18,641/63; Jan. 28, 1964, 3,621/64
9 Claims. (Cl. 167—58)

This invention is concerned with topical compositions comprising new steroid compounds having high anti-inflammatory action on topical administration and their use in alleviating topical inflammatory conditions. This is a continuation of our application S.N. 364,804, filed May 4, 1964, abandoned in favor of this application.

An important use of anti-inflammatory compounds is their use in topical preparations for the local treatment of inflammations and considerable research has been directed to find compounds having good local action on topical administration.

It is an object of the invention to provide new compositions for topical application having high anti-inflammatory action. It is a further object to provide a method for their use in alleviating topical inflammatory conditions.

We have found that certain 17,21-orthoesters hereinafter described in general provide considerably enhanced anti-inflammatory action following topical application as compared with other closely analogous compounds and/or the corresponding 17α,21-dihydroxy parent compounds. These ortho esters have in fact been found to possess anti-inflammatory action on topical application exceeding that of the best compounds hitherto especially proposed for topical purposes (as judged by the patch test of McKenzie et al., Arch. Derm., 1962, 86, 608).

According to the present invention there are employed compounds represented by the general formula:

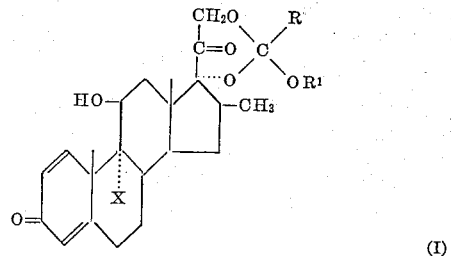

(I)

where X is fluorine or chlorine, R is a polycarbon atom straight or branched chain alkyl group containing up to 4 carbon atoms and $R^1$ is a methyl or ethyl group. Also according to the present invention there is provided a pharmaceutical composition for use in the topical treatment of inflammation comprising a compound of Formula I where R, $R^1$ and X have the meanings stated above together with a topical vehicle for said steroid.

The compounds according to this invention have high anti-inflammatory action on topical administration coupled with low mineralo-corticoid action, as well as low gluco-corticoid activity when administered systemically. The compounds thus have the desirable high anti-inflammatory action on topical administration, with little risk of disturbance of the mineral balance and other systemic action should the compound be absorbed.

Of the compounds of the present invention the methyl ortho valerates have high anti-inflammatory action on topical administration the action of the betamethasone orthoesters especially betamethasone methyl orthovalerate being quite outstanding.

It will be appreciated that the active ortho esters of the present invention can exist in two stereoisomeric forms by virtue of the asymmetry of the carboxylic carbon atom (i.e. the carbon atom linked to the oxygen atoms at the 17- and 21-positions). The two series may for convenience be designated the A and B series. Compounds of the A series are characterised by possessing a more negative or less positive molecular rotation than the corresponding isomers of the B series. Compounds of the A series are preferred as they are more readily prepared.

The active steroid may be formulated into a preparation suitable for topical administration in conventional manner with the aid of one or more carriers or excipients. Examples of types of preparation include ointments, lotions, creams, powders, drops (e.g. ear drops and eye drops), suppositories, retention enemas, chewable or suckable tablets or pellets (e.g. for the treatment of aphthous ulcers) and aerosols. Ointments and creams may for example, be formulated with an aqueous or oily base with the addition of suitable thickening and/or gelling agents. Such bases may thus, for example, include water and/or an oil such as liquid paraffin or a vegetable oil such as arachis oil or castor oil. Thickening agents which may be used according to the nature of the base include soft paraffin, aluminium stearate, cetostearyl alcohol, polyethylene glycols, woolfat, hydrogenated lanolin, beeswax etc.

Lotions may be formulated with an aqueous or oily base and will in general also include one or more of the following namely, emulsifying agents, dispersing agents, suspending agents, thickening agents, colouring agents, perfumes and the like.

Powders may be formed with the aid of any suitable powder base e.g. tac, lactose, starch etc. Drops may be formulated with an aqueous base also comprising one or more dispersing agents, suspending agents, solubilising agents etc.

The pharmaceutical compoistions according to the invention may also include one or more preservatives or bacteriostatic agents e.g. methyl hydroxy benzoate, propyl hydroxy benzoate, chlorocresol, benzalkonium chlorides etc.

The compositions according to the invention may also contain other active ingredients such as antimicrobial agents, particularly antibiotics.

The proportion of active steroid in the compositions according to the invention depends on the precise type of formulations to be prepared but will generally be within the range of from 0.0001% to 5% by weight preferably at least 0.0005%. Generally however for most types of preparations advantageously the proportion used will be within the range of from 0.001 to 0.5% and preferably 0.01 to 0.25%.

The orthoesters according to the invention can be prepared by generally known methods. For example the parent 17,21-hydroxy steroid may be reacted with an ortho ester of the general formula $R-C(OR^1)_3$ (where R and $R^1$ have the above stated meanings).

This reaction is conveniently carried out in the presence of an acid catalyst for example p-toluene sulphonic acid, pyridine hydrochloride or sulphuric acid, in the presence or absence of a solvent. When a solvent is used this may for example be benzene, dioxan, diethyl ether, methylene chloride, ethyl acetate or toluene. The reaction may be effected at ambient or elevated temperature, e.g. up to about 120° C. according to the nature of the reactants, and whether or not a solvent is used. Preferably at least 0.08 molecular equivalents of acid catalyst are used per mole of steroid starting material.

The above processes in general give rise to a mixture of isomers of the A and B series, which can be separated as desired, for example by fractional crystallisation.

In the following preparative Examples 1–10 the isomers prepared are the A isomers unless otherwise stated.

For a better understanding of the invention the following examples are given by way of illustration only:

EXAMPLE 1

*9α-fluoro - 11β - hydroxy-16β-methyl-17α,21-(1'-butyl-1'-methoxymethylenedioxy)pregna-1,4-diene - 3,20 - dione (betamethasone 17,21-methyl orthovalerate)*

A suspension of betamethasone (2.7 gm.) in benzene (sodium dried, 300 ml.) was distilled vigorously for a few minutes. Toluene-p-sulphonic acid monohydrate (50 mg.) and methyl orthovalerate (6.5 ml.) were added in turn and distillation continued until solution of betamethasone was complete (ca. 30 mins.).

The reaction mixture was cooled and treated with solid sodium bicarbonate and a few drops of pyridine. After a few minutes' shaking the solids were removed by filtration and the benzene solution taken to dryness. The oily residue was crystallised twice from ether-petrol to give betamethasone 17,21-methyl orthovalerate (1.3 gm.) as fine needles M.P. 153–154° dec., $[\alpha]_D$+70.9° (c. 1.0 dioxan)

$\lambda_{max.}^{EtOH}$ 239 mμ, ε 16,240

(Found: C, 68.7; H, 8.15; F, 3.9. $C_{28}H_{39}FO_6$ requires C, 68.55; H, 8.0; F, 3.9%.)

EXAMPLE 2

*9α-fluoro - 11β - hydroxy-16β-methyl-17α,21-(1'-ethyl-1'-ethoxymethylenedioxy)pregna - 1,4 - diene-3,20-dione (betamethasone 17,21-ethyl orthopropionate)*

A mixture of betamethasone (200 mg.), ethyl orthopropionate (10 ml.) and toluene-p-sulphonic acid (10 mg.) was heated on a steam bath for 1½ hours and then kept at room temperature for 2½ days. The white solid obtained by filtration was shaken with petroleum-ether containing a few drops of pyridine, and then recrystallised from acetone-petroleum ether to afford betamethasone 17,21-ethyl orthopropionate (86 mg.) M.P. 205–212°, $[\alpha]_D$+64.8° (c. 1.06, dioxan)

$\lambda_{max.}^{EtOH}$ 237–239 mμ ε 15,800

(Found: C, 67.7; H, 7.7; F, 4.1. $C_{27}H_{37}FO_6$ requires C, 68.05; H, 7.8; F, 4.0%.)

EXAMPLE 3

*9α-fluoro - 11β - hydroxy-16β-methyl-17α,21-(1'-n-propyl-1'-methoxymethylenedioxy)pregna-1,4-diene-3,20-dione (betamethasone 17,21-methyl ortho-n-butyrate)*

A suspension of betamethasone (3 g.) in benzene (600 ml.) was distilled for a few minutes. Methyl ortho-n-butyrate (5.9 g.) and toluene-p-sulphonic acid (120 mg.) were added and distillation continued for 10 minutes. The clear solution was cooled and treated with sodium bicarbonate (50 mg.) and pyridine (0.5 ml.). The filtered solution was evaporated in vacuo and the mixture of crude orthoesters chromatographed over basic alumina. Elution with benzene gave a main fraction (2.45 g.) which, after two crystallizations from acetone-petroleum ether, afforded betamethasone 17,21-methyl ortho-n-butyrate M.P. 148°, $[\alpha]_D$+69° (c. 0.45 dioxan)

$\lambda_{max.}^{EtOH}$ 239 mμ ε 15,200

$\nu_{max.}^{nujol}$ 3350, 1732, 1670, 1080 and 1060 cm.$^{-1}$ (Found: C, 68.1; H, 7.7; F, 4.1. $C_{27}H_{37}FO_6$ requires C, 68.05; H, 7.8; F, 4.0%.)

Smaller fractions and the mother liquors from crystallizations were combined and rechromatographed to yield more betamethasone 17,21-methyl ortho-n-butyrate (1.1 g.).

EXAMPLE 4

*9α - fluoro-11β-hydroxy-16β-methyl-17α,21-(1'-isopropyl-1'-methoxymethylenedioxy)pregna-1,4-diene-3,20-dione (betamethasone 17,21-methyl orthoisobutyrate)*

A solution of betamethasone (1 g.) in dry dioxan (45 ml.) containing toluene-p-sulphonic acid monohydrate (50 mg.) and methyl orthoisobutyrate (2.0 ml.) was allowed to stand at room temperature for 10 minutes and then poured into dilute sodium bicarbonate solution. The precipitated solid was recrystallised twice from ether-petroleum ether containing a little triethylamine to give betamethasone 17,21-methyl orthoisobutyrate (576 mg.) as needles, M.P. 173°, $[\alpha]_D$+66.3° (c. 0.9, dioxan)

$\lambda_{max.}^{EtOH}$ 239 mμ (ε 15,920)

(Found: C, 67.95; H, 7.95. $C_{27}H_{37}FO_6$ requires C, 67.95; H, 7.85%.)

EXAMPLE 5

*9α-fluoro - 11β - hydroxy-16β-methyl-17α,21-(1'-isobutyl-1'-methoxymethylenedioxy)pregna-1,4-diene-3,20-dione (betamethasone 17,21-methyl orthoisovalerate)*

Betamethasone (1 g.) was treated with methyl orthoisovalerate (2.0 ml.) as described in Example 4 to give betamethasone 17,21-methyl orthoisovalerate (296 mg.) as fien needles, M.P. 176°, $[\alpha]_D$+64.5° (c. 1.08 dioxan)

$\lambda_{max.}^{EtOH}$ 239 mμ (ε 15,590)

(Found: C, 68.75; H, 8.4. $C_{28}H_{39}FO_6$ requires C, 68.55; H, 8.0%.)

EXAMPLE 6

*9α-fluoro - 11β - hydroxy-16β-methyl-17α,21-(1'-butyl-1'-methoxymethylenedioxy)pregna - 1,4-diene-3,20-dione, B isomer (betamethasone 17,21-methyl orthovalerate, B isomer)*

A suspension of betamethasone (4.4 g.) in benzene (1000 ml.) was distilled for a few minutes and toluene-p-sulphonic acid monohydrate (120 mg.) and methyl orthovalerate (3.0 ml.) were added. The mixture was refluxed for 30 minutes and the benzene solution was cooled, treated with solid sodium bicarbonate and a few drops of pyridine, filtered and taken to dryness.

The residue was taken up in ether and the crude orthoester (A isomer, 4.12 g.) precipitated with petrol and removed by filtration. Evaporation of the mother liquors gave an oily residue (approx. 1.5 g.) shown to be a 1:1 mixture of the two isomers by thin layer chromatography. This material, in benzene, was chromatographed on 30 parts grade III basic alumina and the first fractions, which were rich in the B isomer, were combined (350 mg.). Further chromatography on large alumina plates afforded pure betamethasone 17,21-methyl orthovalerate, B isomer (73 mg.) as prisms, from ether-petrol, M.P. 148–149°, $[\alpha]_D$+84.6° (c. 0.8, acetone)

$\lambda_{max.}^{EtOH}$ 239 mμ (ε 14,960)

(Found: C, 68.7; H, 7.8; $C_{28}H_{39}FO_6$ requires C, 68.55; H, 8.0%.)

The following example shows the preparation of the compound of Example 1 on a larger scale.

EXAMPLE 7

*9α-fluoro-11β -hydroxy - 16β - methyl-17α,21-(1'-butyl-1' - methoxymethylenedioxy)pregna - 1,4 - diene-3,20-dione (betamethasone-17,21-methyl orthovalerate)*

With stirring and at room temperature, betamethasone alcohol (200 g.) was suspended in dry methylene chloride (2.0.1). Methyl orthovalerate (182 ml.) was added as a single charge and the mixture heated to reflux on a steam bath. Toluene-p-sulphonic acid monohydrate (7.5 g.) in dry ethyl acetate (68 ml.) was added to the refluxing suspension over 5 minutes. Solution was complete towards the end of the addition. The reaction was completed by continuing the reflux for 30 minutes.

The reaction mixture was concentrated to low bulk by vacuum distillation and the residue triturated with petroleum ether (B.P. 80–100°) (2.0 l.). The solid was filtered off, washed with petroleum ether (B.P. 80–100°) (500 ml.) and air dried to give betamethasone 17α,21-methyl-orthovalerate (232 g.; 93% of theory), M.P. 152° (dec.), $[\alpha]_D+70°$ (c. 1.0 Me$_2$CO).

EXAMPLE 8

*9α-chloro-11β-hydroxy-16β-methyl-17α,21-(1'-ethyl-1'-ethoxymethylenedioxy)pregna-1,4-diene-3,20-dione*

(a) *9α-chloro-11β,17α,21-trihydroxy-16β-methylpregna-1,4-diene-3,20-dione*

A suspension of 9β,11β-epoxy-17α,21-dihydroxy-16β-methylpregna-1,4-diene-3,20-dione (4 g.) in concentrated hydrochloric acid (37% w./w.; 80 ml.) was shaken at room temperature for 5 min., by which time all the starting material had dissolved. Water (80 ml.) was added to the solution and the resultant suspension was shaken for 4 hours and then poured into a solution of potassium carbonate (160 g.) in water (200 ml.). The precipitated chlorohydrin (4.1 g.) was recrystallised twice from acetone to give an analytically pure sample, M.P. 204–206° (dec.), $[\alpha]_D+140.5°$ (c. 0.9 in dioxan)

$\lambda_{max.}^{EtOH}$ 238–239 mμ, ε 15,700

(Found: C, 64.8; H, 7.2; Cl, 8.3. C$_{22}$H$_{29}$ClO$_5$ requires C, 64.6; H, 7.1; Cl, 8.6%.)

(b) *9α-chloro-11β-hydroxy-16β-methyl-17α,21-(1'-ethyl-1'-ethoxymethylenedioxy)pregna-1,4-diene-3,20-dione*

9α - chloro - 11β,17α,21-trihydroxy-16β-methylpregna-1,4-diene-3,20-dione (340 mg.) prepared as in Example 8(a) in dioxan (15 ml.) was treated with toluene-p-sulphonic acid monohydrate (10 mg.) and ethylorthopropionate (0.48 ml.). After 35 min. the reaction mixture was poured into dilute aqueous sodium hydrogen carbonate (110 ml.) and the resultant precipitate (405 mg.) was recrystallised from acetone containing a trace of pyridine to give the orthoester (230 mg.), M.P. 152–157°, $[\alpha]_D+106°$ (c. 0.8 in dioxan)

$\lambda_{max.}^{EtOH}$ 238–239 mμ ε 15,600

(Found: C, 66.2; H, 7.6; Cl, 7.2. C$_{27}$H$_{37}$ClO$_6$ requires C, 65.8; H, 7.6; Cl, 7.2%.)

EXAMPLE 9

*9α-fluoro - 11β - hydroxy - 16β-methyl-17α,21-(1'-butyl-1'-methoxymethylenedioxy)pregna - 1,4 - diene - 3,20-dione (betamethasone 17,21-methyl orthovalerate)*

Betamethasone alcohol (1.1 g.) was suspended in ethyl acetate (11 ml.). Methyl orthovalerate (0.75 ml.) and 10% sulphuric acid in ethyl acetate (0.05 ml.) were added. The mixture was heated to reflux temperature whereupon a solution was formed. The solution was boiled under reflux for 30 minutes and then cooled to room temperature and subjected to thin layer chromatography to yield betamethasone 17,21-methyl orthovalerate (95 to 98% of theory), having spectroscopic and chromatographic properties identical with the orthovalerate prepared as in Example 1.

EXAMPLE 10

*9α-fluoro - 11β - hydroxy - 16β-methyl-17α,21-(1'-butyl-1'-methoxymethylenedioxy)pregna - 1,4 - diene - 3,20-dione (betamethasone 17,21-methyl orthovalerate)*

(a) A drop of concentrated sulphuric acid was added to a suspension of betamethasone (490 mg.) in methyl orthovalerate (5 ml.) and the mixture gently warmed until a clear solution was obtained. After the solution had been kept at room temperature for 30 minutes, petroleum ether was added and the precipitated solid removed by filtration and stirred with dilute sodium bicarbonate solution and again filtered and washed well with water. The dried steroid was filtered through basic alumina (7 g.) in benzene and then recrystallised from ether-acetone-petroleum ether to afford betamethasone 17,21-methyl orthovalerate (265 mg.) having spectroscopic and chromatographic properties identical with the orthovalerate prepared as in Example 1.

(b) Pyridine hydrochloride was added to a solution of betamethasone alcohol (1 g.) in dioxan (40 ml.) containing methyl orthovalerate (2 ml.) and after warming on a steam bath for a few minutes the mixture was left to stand at room temperature for 18 hours.

A few drops of pyridine and solid sodium bicarbonate was added and after being shaken for 1 minute the solids were filtered off and most of the dioxan evaporated in vacuo. Trituration of the residue gave a white solid which was dissolved in benzene and filtered through basic alumina (10 g.). The eluted steroid was recrystallised from ether-acetone-petroleum ether to afford betamethasone 17,21-methyl orthovalerate (565 mg.) having spectroscopic and chromatographic properties identical with the orthovalerate prepared in Example 1.

The following examples illustrate topical formulations prepared in accordance with the invention. In each example the active ingredient is betamethasone methyl orthovalerate, but it will be appreciated that this substance may be replaced by other active ortho compounds used in accordance with the invention.

The following Examples 11–14 illustrate the preparation of ointments.

EXAMPLE 11

| | Percent w./w. |
|---|---|
| Betamethasone methyl orthovalerate | 0.125 |
| Liquid paraffin B.P. | 10.0 |
| White soft paraffin to produce 100 parts by weight. | |

Ball-mill the steroid with a little of the liquid paraffin until the particle size is reduced to a maximum of 5μ and preferably mainly below 2μ. Dilute the paste and rinse out the mill with the remaining liquid paraffin, mix and add the suspension to the melted white soft paraffin at 50° C. Stir until cold to give a homogeneous ointment.

EXAMPLE 12

| | Percent w./w. |
|---|---|
| Betamethasone methyl orthovalerate | 0.25 |
| Aluminum stearate | 3.2 |
| Liquid paraffin B.P. to 100 parts. | |

Disperse the aluminium stearate in the liquid paraffin by vortex stirring and heat the suspension with continued stirring, at a temperature rise rate of 2° C. per minute until 90° C. is reached. Maintain the temperature at 90–95° C. for 30 minutes until solution is complete and a gel is formed. Cool quickly, preferably by the use of cooling coils or concentric cooling rings to produce a transparent solid gel. Ball-mill the steroid with some of the gel as described in Example 11 and mix the milled paste with further portions of the gel to produce a homogeneous mix.

EXAMPLE 13

| | Percent w./w. |
|---|---|
| Betamethasone methyl orthovalerate | 0.1 |
| Woolfat | 12.0 |
| Cetostearyl alcohol B.P.C. | 20.0 |
| Liquid paraffin | 25.0 |
| White soft paraffin to 100 parts. | |

Ball-mill the steroid with a little of the liquid paraffin as in Example 11 and add the resulting paste, diluted with the remaining liquid paraffin, to a mixture of cetostearyl alcohol, woolfat and white soft paraffin, melted together by gentle warming. Stir until cold to give a homogeneous mix.

EXAMPLE 14

| | Percent w./w. |
|---|---|
| Betamethason methyl orthovalerate | 0.1 |
| Hydrogenated lanolin (e.g. Lanocerina sold by Croda Ltd. of London W.C. 2, England) | 20.0 |
| Liquid paraffin | 15.0 |
| White soft paraffin to 100 parts. | |

Ball-mill the steroid with liquid paraffin as in Example 11, and add the resulting paste, diluted with the remaining liquid paraffin to the mixture of hydrogenated lanolin and white soft paraffin, melted together by gently warming. Stir until cold to give a homogeneous mix.

The following Examples 15 and 16 illustrate the preparation of water-miscible creams:

EXAMPLE 15

| | Percent w./w. |
|---|---|
| Betamethasone methyl orthovalerate | 0.1 |
| Beeswax | 15.0 |
| Cetostearyl alcohol | 7.0 |
| Cetomacrogol 1000 B.P.C. | 3.0 |
| Liquid paraffin | 5.0 |
| Chlorocresol | 0.1 |
| Distilled water to produce 100 parts by weight. | |

Ball-mill the steroid with a little liquid paraffin as described in Example 11. Heat the available water to 100° C., add the chlorocresol, stir to dissolve and cool to 65° C. Melt together the beeswax, cetostearyl alcohol and cetomacrogol and maintain at 65° C. Add the steroid suspension using the remaining liquid paraffin for rinsing. Add the steroid oily phase at 60° C. to the chlorocresol aqueous phase at 65° C. and stir rapidly while the emulsion cools over the gelling point (40–45° C.). Continue to stir at slow speed until the cream sets.

EXAMPLE 16

| | Percent w./w. |
|---|---|
| Betamethasone methyl orthovalerate | 0.1 |
| Cetostearyl alcohol | 7.2 |
| Cetomacrogol 1000 B.P.C. | 1.8 |
| Liquid paraffin | 6.0 |
| White soft paraffin | 15.0 |
| Chlorocresol | 0.1 |
| Distilled water to produce 100 parts by weight. | |

Prepare as described in Example 15, replacing the beeswax with white soft paraffin in the oily phase.

The following Examples 17 and 18 illustrate the preparation of lotions:

EXAMPLE 17

| | Percent w./v. |
|---|---|
| Betamethasone methyl orthovalerate | 0.5 |
| Lanbritol wax [1] | 0.93 |
| Diethylene glycol monostearate | 0.65 |
| Cetostearyl alcohol | 0.65 |
| Liquid paraffin | 1.95 |
| Glycerin | 5.0 |
| Isopropyl alcohol | 6.5 |
| Methyl p-hydroxy benzoate | 0.15 |
| Distilled water to produce 100 volumes. | |

[1] Lanbritol Wax is a non-ionic wax for stabilizing emulsions consisting of a mixture of fatty alcohols with polyethylene glycol ethers of fatty alcohols sold by Ronsheim Moore of London W.C. 1, England.

Ball-mill the steroid with half the glycerin, as in Example 11, and use the isopropyl alcohol for dilution and rinsing purposes.

Melt together the Lanbritol Wax, diethylene glycol monostearate, cetostearyl alcohol and liquid paraffin and maintain at 60° C. Heat the available water and remaining glycerin to 95° C. Add the methyl parahydroxy benzoate and stir until dissolved. Cool to 65° C. Add the oily mix at 60° C. to the aqueous phase at 65° C. and allow to cool while stirring rapidly until the emulsion gels at 40–45° C., thereafter stir slowly. Add the well mixed steroid suspension slowly to the lotion base and stir to obtain a homogeneous mix.

EXAMPLE 18

| | Percent w./v. |
|---|---|
| Betamethasone methyl orthovalerate | 0.1 |
| Tween 80 (Polyoxyethylene sorbitan mono-oleate sold by Atlas Powder Co. Ltd.) | 0.01 |
| Carbopol 934 (Carboxy vinyl polymers sold by B. F. Goodrich Chemical Co., Cleveland, Ohio) | 0.3 |
| Diethanolamine (approx.) | 0.5 |
| Distilled water to produce 100 vols. | |

Ball-mill the steroid with a little water and the Tween 80 as in Example 11. Disperse the Carbopol 934 in the available water by vortex stirring. Add the diethanolamine, slowly with stirring until the clear thickened mix has a pH of 7.0. Incorporate the steroid slurry into the lotion base and mix well.

EXAMPLE 19

Aerosol spray lotion

| | |
|---|---|
| Betamethasone orthovalerate mgm | 5.0 |
| Fractionated coconut oil to gm | 1.20 |
| Dichlorodifluoromethane gm | 16.32 |
| Trichlorofluoromethane gm | 24.48 |

Dry the betamethasone orthovalerate overnight at 60° C. under vacuum and over phosphorus pentoxide. Ball-mill the dried powder for at least 4 hours with a little of the dried filtered oil. Rinse out the mill with more dried filtered oil and pass the suspension through a 325 mesh B.S. sieve. Assay the suspension and dilute with more dried filtered oil to the required concentration. Incorporate the suspension into the pressure container with the propellants in a conventional manner.

EXAMPLE 20

Aphthous ulcer pellets

| | |
|---|---|
| Betamethasone orthovalerate mgm | 0.5 |
| Lactose mg | 69.90 |
| Acacia mg | 3.00 |
| Magnesium stearate mg | 0.75 |

Pass the steroid, lactose and acacia, separately through a No. 60 B.S. mesh sieve. Blend the powders and granulate with 50% ethanol in water. Pass the mass through a No. 12 mesh B.S. sieve and dry the granules at 50° C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

EXAMPLE 21

| Retention enema | Percent w./v. |
|---|---|
| Betamethasone orthovalerate | 0.001 |
| Tween 80 (polyoxyethylene sorbiton mono-oleate sold by Atlas Powder Co. Ltd.) | 0.05 |
| Ethanol | 0.015 |
| Methyl p-hydroxy benzoate | 0.08 |
| Propyl p-hydroxy benzoate | 0.02 |
| Distilled water to 100 vols. | |

Heat the available water to 95° C. add the methyl and propyl p-hydroxy benzoate and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into polythene plastic bags for self-administration or into other containers suitable for use.

EXAMPLE 22

| Eye drops | Percent w./v. |
|---|---|
| Betamethasone orthovalerate | 0.05 |
| Tween 80 | 2.5 |
| Ethanol | 0.75 |
| Benzalkonium chloride | 0.02 |
| Phenyl ethanol | 0.25 |
| Sodium chloride | 0.60 |
| Water for injection to 100 volumes. | |

Dissolve the sodium chloride, benzalkonium chloride and phenyl ethanol in the water for injection. Suspend the steroid in the alcohol and add to the Tween 80. Warm the mixture to 50° C. and stir until dissolved. Add the steroid solution to the eye-drop vehicle with rapid stirring to obtain a clear solution. Sterilise the bulk by filtration through a 5/3 sintered glass filter and distribute into sterile small well filled, neutral glass eye-drop containers.

EXAMPLE 23

Nasal drops

| | Percent w./v. |
|---|---|
| Betamethasone orthovalerate | 0.01 |
| Tween 80 | 0.05 |
| Alcohol 95% | 0.15 |
| Methyl p-hydroxy benzoate | 0.04 |
| Propyl p-hydroxy benzoate | 0.02 |
| Sodium chloride | 0.70 |

Distilled water to 100 volumes.

Dissolve the sodium chloride and the methyl and propyl-p-hydroxy benzoates in the distilled water, heated to 95° C. and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

We claim:

1. A pharmaceutical composition for use in the topical treatment of inflammation comprising a steroid of the formula:

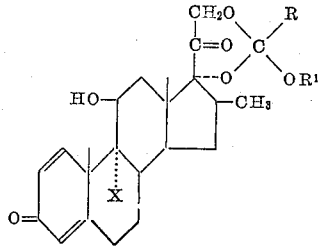

where X is chlorine or fluorine, R is ethyl, propyl or butyl, and $R^1$ is methyl or ethyl, and a topical vehicle for said steroid.

2. A composition as claimed in claim 1 in which the steroid is 9α-fluoro-11β-hydroxy-16β-methyl-17α,21 - (1'-propyl-1'-methoxymethylenedioxy)pregna-1,4 - diene - 3,20-dione.

3. A composition as claimed in claim 1 in which the steroid is 9α-fluoro-11β-hydroxy-16β-methyl-17α,21 - (1'-butyl-1'-methoxymethylenedioxy)pregna-1,4-diene - 3,20-dione.

4. A composition as claimed in claim 1 wherein the topical vehicle is selected from the group consisting of lotions, ointments and creams.

5. A composition as claimed in claim 1 containing from 0.0001 to 5 percent by weight of said steroid.

6. A pharmaceutical composition as claimed in claim 5 wherein the topical vehicle is selected from the group consisting of ointments, creams, lotions, powders, drops, suppositories, retention enemas, chewable tablets, suckable tablets and aerosols.

7. A method for alleviating topical inflammatory conditions which comprises applying to the afflicted area an effective amount of a steroid of the formula:

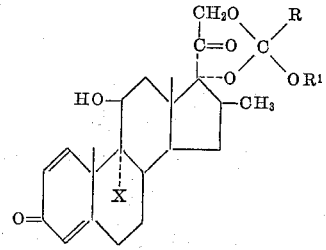

where X is fluorine or chlorine, R is ethyl, propyl or butyl and $R^1$ is methyl or ethyl, in a topical vehicle for said steroid.

8. A method according to claim 7 wherein the steroid is 9α-fluoro-11β-hydroxy-16β-methyl-17α,21-(1' - propyl-1'-methoxymethylenedioxy)pregna-1,4-diene-3,20-dione.

9. A method according to claim 7 wherein the steroid is 9α-fluoro-11β-hydroxy-16β-methyl-17α,21-(1'-butyl-1'-methoxymethylenedioxy)pregna-1,4-diene-3,20-dione.

No references cited.

LEWIS GOTTS, *Primary Examiner.*

HENRY A. FRENCH, *Assistant Examiner.*